United States Patent [19]
Jorde

[11] Patent Number: 5,312,504
[45] Date of Patent: May 17, 1994

[54] EDGE VENEERING

[76] Inventor: Edward P. Jorde, Cottage Pl.; Box 103, Granite Springs, N.Y. 10527

[21] Appl. No.: 989,240

[22] Filed: Dec. 11, 1992

[51] Int. Cl.⁵ ............... B27D 1/00; B32B 31/00
[52] U.S. Cl. ............................... 156/258; 144/346; 144/348; 144/352; 156/510
[58] Field of Search .............. 156/256, 258, 510; 144/346, 348, 352

[56] References Cited

U.S. PATENT DOCUMENTS 4,328,067  5/1982  Cesano ............................ 156/510
5,076,880  12/1991  Spengler et al. .................. 156/510

FOREIGN PATENT DOCUMENTS 3011171  10/1981  Fed. Rep. of Germany ...... 144/352

Primary Examiner—W. Donald Bray
Attorney, Agent, or Firm—Joseph B. Taphorn

[57] ABSTRACT

Complex edges of workpieces are veneered by stretching a thin flexible veneer strip over the edges and moving the workpiece edge against a yieldably mounted heated bar having a complementary surface to seat the strip and bond it the workpiece edge. The yieldably mounted bar moves in a second direction as it is moved by the workpiece to fully seat the veneer strip before the adhesive previously applied to the edge is heat-set by the bar.

20 Claims, 3 Drawing Sheets

EDGE VENEERING

FIELD OF THE INVENTION

This invention relates to a method and apparatus for edge veneering large (both in length and width) boardlike workpieces, and more particularly to a method and apparatus for placing thin flexible veneer strips on complex surfaces of edges of such large board-like workpieces.

BACKGROUND

Veneering involves bonding a thin finishing layer to an inferior substratum. Until recently, in fine woodworking, a solid, pre-milled, stiff strap of an expensive wood was placed over a less expensive wood (including particle board and chip core), particularly where the external surface of the edge of the finished product involved a complex surface (surface other than flat for purposes such as finger pulls and the like). Such edge treatment was time consuming and expensive.

In the old process, the workpiece to get the edge treatment is first cut to rough size, and then the edges planed to precise size and a groove cut out of the center of the edge. The groove is to receive the tongue of a piece of solid wood strap to be mounted on the workpiece edge. The piece of solid wood strap is usually prepared from a hardwood having the desired grain and finish properties by suitable milling operations. Glue is then applied to one or both of the surfaces having the groove and tongue, and the solid wood strap placed against the workpiece so that the former's tongue is received in the later's groove and the strip is flush against the workpiece. After the glue has set, the wood strap is trimmed, as by cutting and sanding, at its edges, to matching flatness with the other surfaces of the finished product.

Cutting out the workpiece groove and a tongue on the solid wood strap, waiting for the glue to set, and the sanding, all take time and money.

SUMMARY OF THE INVENTION

Accordingly, the objects of the invention are to make veneering easier, less expensive, and less time consuming.

The method and apparatus for achieving the objects of the invention involve cutting the workpiece to the precise sized and milling the edges thereof to give them a desired complex surface such as that for a finger pull. A strip of thin flexible veneer is then stretched over the edge after its engaging face or the that of the edge of the workpiece has had an adhesive applied. Then the workpiece and an object with a complementary surface are brought together so as to seat the flexible veneer strip on the workpiece edge. The object is yieldably displaced slightly on contact with the workpiece. During this yieldable displacement, it may engage in relative movement in another direction with respect to that of the workpiece surface to insure seating of all portions of the veneer strip.

Seating apparatus used to help carry out the method includes a bar formed with a surface complementary to that of the edge of the workpiece and adapted to be engaged and displaced thereby. The bar is biased as by springs to an outward position to which it is guided by pins or rods passing through apertures in it and secured to a frame behind the bar. The pins are inclined to the horizontal so that as the bar is displaced inward by the oncoming workpiece, it is also forced downward somewhat so that downwardly facing portions of its complementary surface firmly engage and seat the portions of the thin flexible veneer on the oncoming edge of the workpiece on any upwardly facing portions of the surface of the edge. A guide on the upper part of the frame aides the pins in guiding the bar downwards as it is displaced rearwardly.

BRIEF DESCRIPTION OF DRAWINGS OF EMBODIMENTS OF THE INVENTION

These and other objects, features and advantages of the invention will become apparent from a reading of the following description of preferred embodiments of the invention, when considered with the appended drawings wherein:

FIG. 1 is a diagrammatic side view of apparatus having a displaced heated bar with a surface complementary to that on the rubbet edge of a workpiece, for seating and bonding a thin flexible veneer on the rubbet edge of a workpiece;

FIG. 2 is a diagrammatic side view of apparatus having a displaced heated bar with a surface complementary to that on the finger pull edge of a workpiece, for seating and bonding a thin flexible veneer on the finger pull edge of a workpiece; and FIG. 3, is a diagrammatic side view of apparatus having a displaced heated bar with a surface complementary to that on a different finger pull edge of a workpiece, for seating and bonding a thin flexible veneer on the finger pull edge of a workpiece.

DETAILED DESCRIPTION OF PREFERRED EMBODIMENTS OF THE INVENTION

Figure 1:
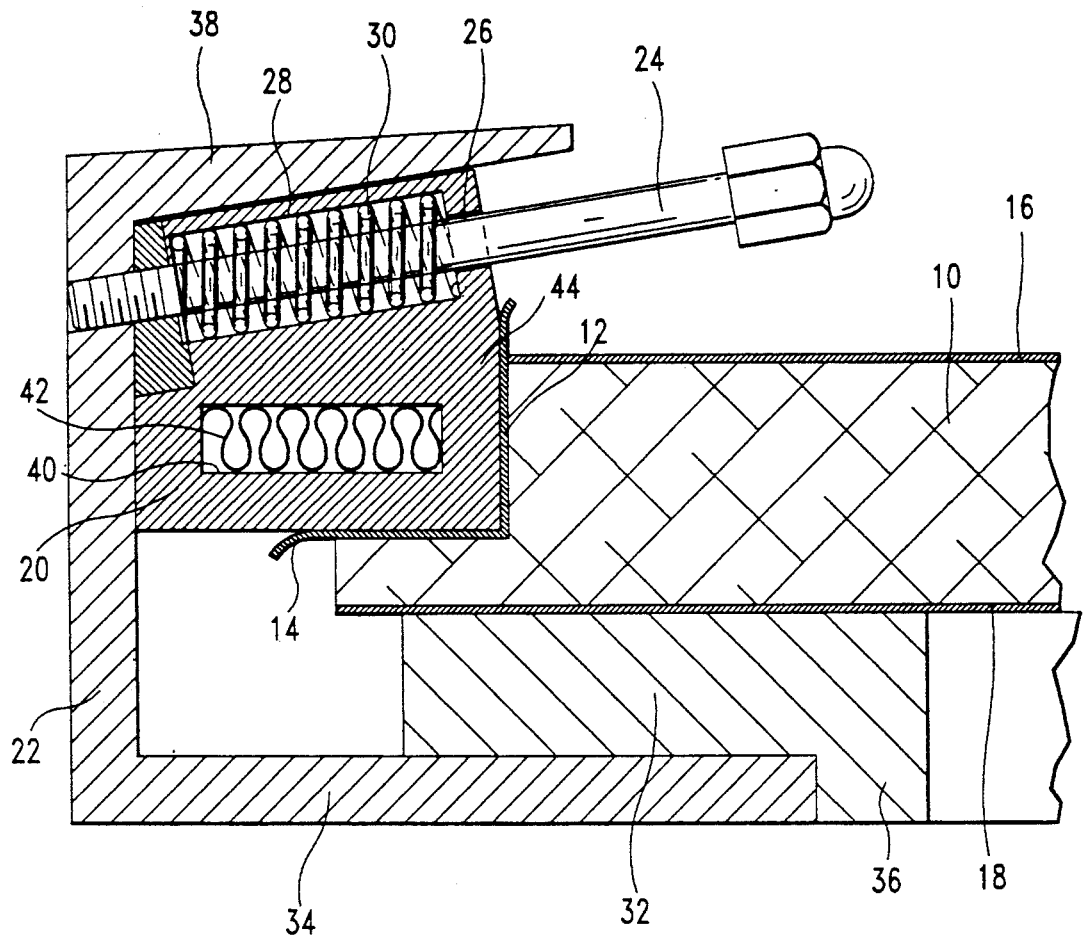

Referring now to the drawings, there is shown in each of the drawings a workpiece 10 in the nature of a board that has its left hand edge 12 milled to provide a desired complex surface such as a rubbet or a finger pull. A strip of thin flexible wood veneer 14, such as that commercially available from Constantine's Headquarters, 2050 Eastchester Road, Bronx, N.Y., is stretched across each of the edges 12.

Veneer strips 16 and 18 of the thin flexible veneer or other kind have already been applied to the upper and lower surfaces of the workpieces and trimmed to their edges.

The workpieces 10 are shown as having their edges in engagement with the complimentary faces of rearwardly displaced differently faced seating and bonding bars 20.

A bar 20 is supported on a suitably fixed frame 22 by pins 24 screwed at their rear ends into the frame 20. The pins 24 pass through apertures 26 in the upper front portions of the bar 20 which are of a size sufficient to enable the bar to slide freely on the pins 24. Enlarged openings 28 in the bar 20 behind the apertures 26, hold compression springs which interact between the bar 20 and the frame 22 to urge the bar forward on its pins 24.

It will be observed that the pins 24 incline downwardly towards their rears, and that the apertures 26 and enlarged openings 28 do the same in the bar. It results that when the bar 20 is displaced rearwardly by an oncoming workpiece 10, that the bar also engages in a slight downward movement. Thus as best appreciated from a viewing of FIG. 1. The horizontal component of the thin flexible veneer 14 is also pressed firmly against the horizontal component of the rubbet face on edge 12 so as to be in good bonding relationship therewith.

A spacer block 32 of suitable size rests upon the horizontal leg 34 of the frame 32 so as to properly align the workpiece 10 sliding thereon with the bar 20. A depending portion 36 engages the outer edge of the leg 34 to hold the block 32 in place during sliding of the workpiece 10 thereon to engage the seating and bonding bar 20.

The upper end of the frame 22 has a forwardly and upwardly extending arm 38. The upper surface of the bar 20 parallels the upwardly and forwardly extending lower surface of the arm 38, to provide a reinforcing guide for the bar 20 on the pins 24 as it is displaced rearwardly by the workpiece 10 engaging it as the former slides on the block 32. The pins 24 may therefore be of substantially lighter construction than if the guide arm 38 were not there.

The bar 20 also has a rectangular hole 40 running through its length which contains an electrical heating tape 42 for heating the bar to a suitable bonding temperature for the particular adhesive used to glue the thin flexible veneer 14 to the face of the edge 12 of the workpiece 10. A conventional controller, not shown, may be used to regulate the temperature of the bar.

To enable the bars 20 to completely seat and bond the veneers 14 to the workpiece edges 12, the forward portions 44 of the bars 20 are formed with surfaces complementary to the that of the edge 12 to be veneered. Thus in FIG. 1, the forward portion 44 is formed with a convex right angle face to complement the concave right angle face of the edge 12. Upon closure of the workpiece 10 with the bar 20, the vertical component of the edge face strikes the vertical component of the bar face to displace the bar 20 rearwardly and seat the portion of the veneer strip 14 upon the edge vertical component. The rearward displacement of the bar 20 also imparts a slight downward motion to the bar 20 to press the horizontal component of the bar face upon the portion of the veneer strip upon the horizontal component of the workpiece edge face. Any downward pull on the vertical portion of the veneer strip on the workpiece edge face is accommodated by sliding action of that veneer strip on the workpiece edge vertical portion as the heat from the bar 20 does not set the adhesive until a preselected time thereafter. The workpiece 20 is withdrawn from its position against the bar 20 after the adhesive is set by the heat. Application of the bar 20 heat results in quick setting of the adhesive and permits rapid manufacture.

Figure 2:
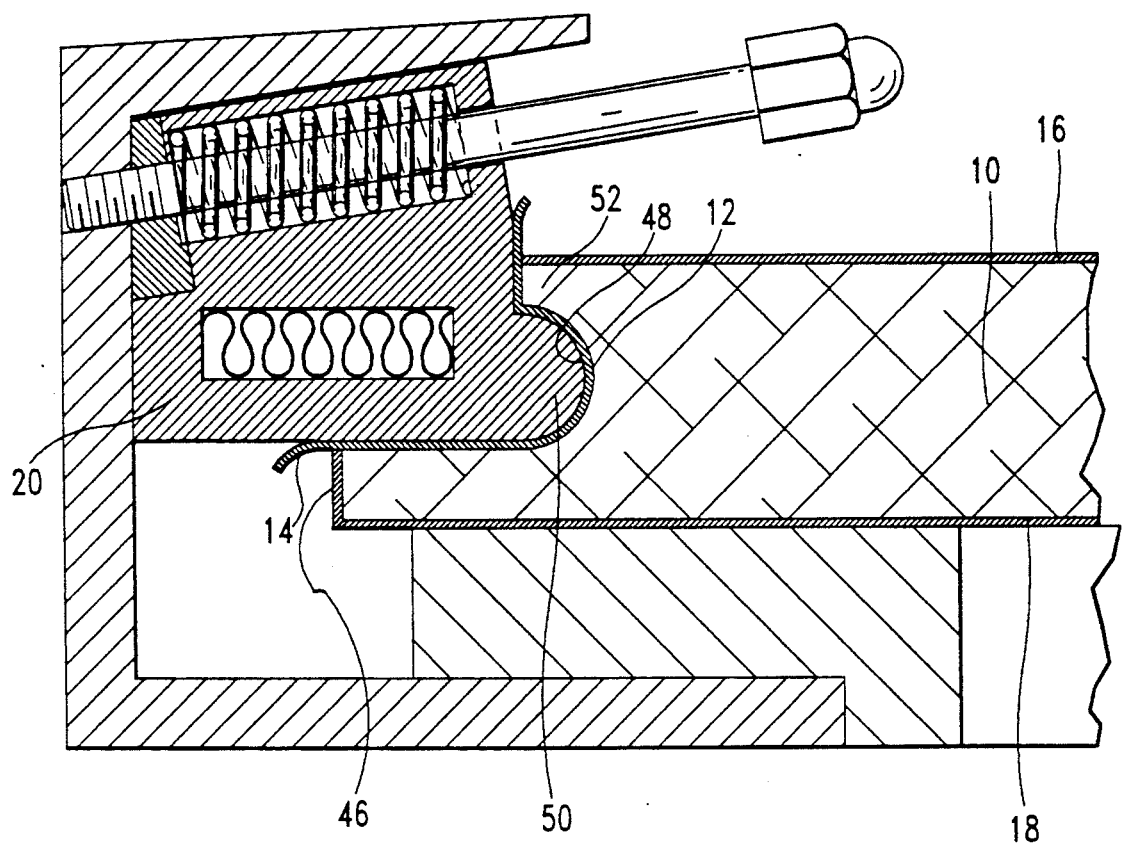

In FIG. 2, a finger pull edge requires partial flexible strip veneering of a workpiece edge already partially covered with the standard veneer 46 also obtaining at 16 and 18 on the top and bottom of the workpiece 20. The making of a finger pull edge essentially adds a semi-cylindrical cut-out 48 to the bottom of the vertical component of the rubbet face on the edge of the FIG. 1 workpiece 10. It also entails the addition of a complementary semi-cylindrical extension 50 to the bottom of the vertical component of the face of the front edge 44 of the bar 20. In the displaced position of the bar 20, the semi-cylindrical extension 50 will be seated in the semi-cylindrical groove 48, firmly pressing the flexible veneer strip 12 against the curved workpiece edge. During the approach of the workpiece 10, the semi-cylindrical extension on its upper surface may be engaged by the upper extension 52 of the workpiece edge; as the bar 20 retreats backwardly and downwardly, the extension 50 will slide under the extension 52 to seat fully in the cut-out 48 and seat the flexible veneer strip fully therein.

Figure 3:
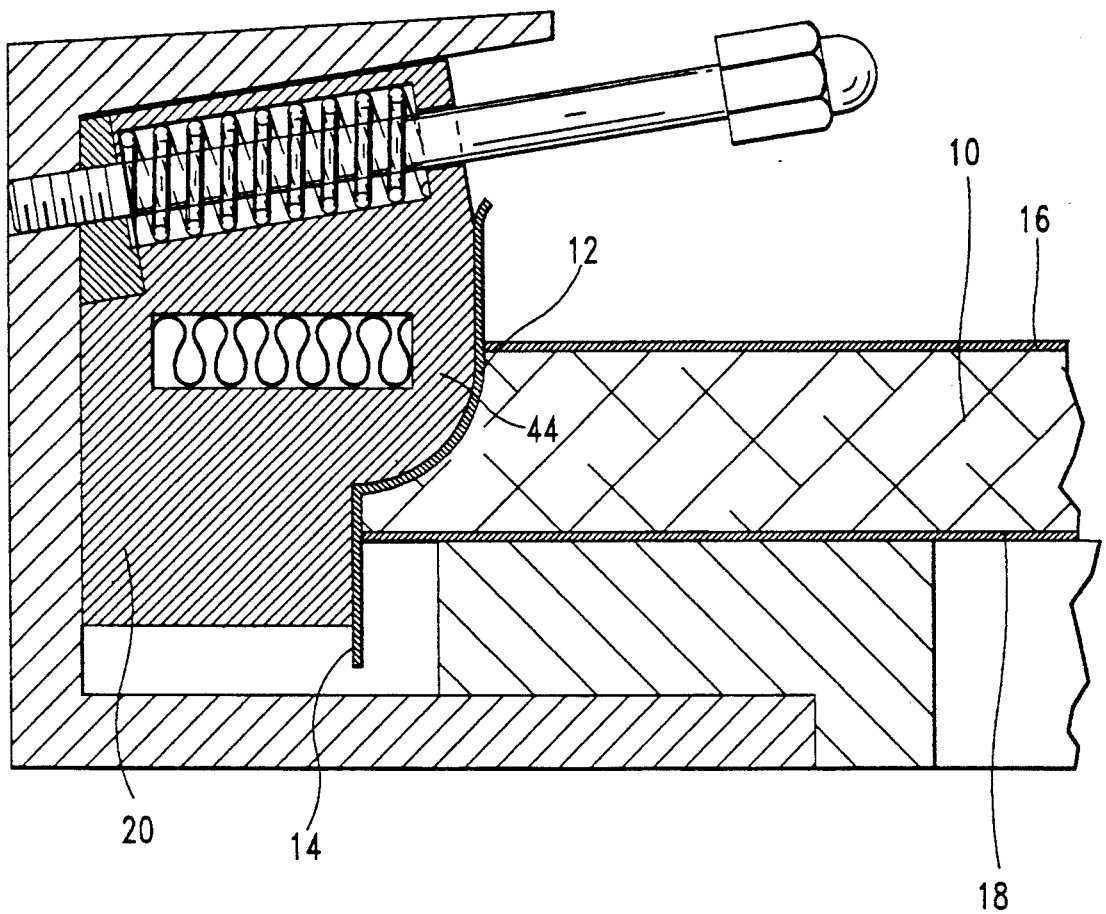

In FIG. 3, a finger pull involving veneering over the entire workpiece edge is shown; a concave upper portion terminates in a lower straight portion. The bar edge 44 is formed with a full-length complementary surface to match.

In carrying out the invention, the work piece 10 is first cut to the precise size for milling its edges. The thin flexible veneer strip 12 is then stretched over an edge to be veneered after an a heat setting adhesive has been applied across the workpiece edge. Next the workpiece 10 is moved so that its edge bearing the veneer strip engages the complementary face of the seating and bonding bar 20 and dispaces it rearwards and downwards so that it seats the veneer strip fully and then heats the strip to set the adhesive to bond the strip to the workpiece edge. The work piece is then separated from the bar 20, and the operation repeated with another edge. The loose ends of the veneer strip are subsequently removed as by sanding.

While I have shown and described preferred embodiments of the invention, it will be apparent to those skilled in the art that other and different applications of the principles of the invention may be made. Accordingly, it is intended to be limited only by the spirit and-/or scope of the appended claims.

What is claimed is:

1. A method of veneering an edge having a complex surface of a workpiece comprising the steps of forming the edge in the shape desired, stretching a flexible veneer strip across the edge, and pressing the veneer strip against the edge with a fully complementary surface.

2. A method according to claim 1, and applying an adhesive to one of the to-be-abutted surfaces of the edge and the veneer before stretching the veneer across the edge.

3. A method according to claim 1, wherein the step of forming the edge includes the preliminary step of cutting the workpiece to size.

4. A method according to claim 1, wherein the step of forming the edge includes the step of milling the edge to the complex surface desired.

5. A method according to claim 3 wherein the step of forming the edge includes the step of milling the edge to the complex surface desired.

6. A method of veneering an edge having a complex surface of a workpiece comprising the steps of forming the edge in the shape desired, stretching a flexible veneer strip across the edge, and pressing the veneer strip against the edge with a complementary surface, wherein pressing the veneer strip with a complementary surface involves moving the workpiece edge against a yieldable bar having the complementary surface.

7. A method according to claim 6, wherein the yieldable bar also moves in a second direction when displaced by the workpiece.

8. A method according to claim 7, and applying an adhesive to one of the to-be abutted surfaces of the edge and the veneer before stretching the veneer across the edge, and heating the bar to set the adhesive to bond the veneer strip to the workpiece edge.

9. A method according to claim 8, and separating the workpiece from the yieldable bar, and trimming the any excess veneer strip from the workpiece.

10. Apparatus for veneering the edge of a workpiece, comprising a bar having a surface fully complementary to that of the edge, and means for automatically positioning the bar surface with respect to the edge surface as one of the bar and workpiece is moved into engagement with the other.

11. Apparatus according to claim 10, wherein the bar is movably mounted on a frame.

12. Apparatus for veneering the edge of a workpiece, comprising a bar having a surface complementary to that of the edge, and means for automatically positioning the bar surface with respect to the edge surface as one of the bar and workpiece is moved into engagement with the other, wherein the bar is movably mounted on a frame, wherein the bar is slidably mounted on the frame and is movable by the workpiece.

13. Apparatus according to claim 12, wherein bar movement is generally in the same direction as that of the workpiece.

14. Apparatus according to claim 13, wherein movement of the bar by the workpiece is stopped by engagement of the bar with a fixed portion of the frame.

15. Apparatus according to claim 13, wherein movement of the bar also includes a downward component to seat a portion of the bar face upon any generally horizontal upward looking face on the workpiece edge.

16. Apparatus for veneering the edge of a workpiece, comprising a bar having a surface complementary to that of the edge, and means for automatically positioning the bar surface with respect to the edge surface as one of the bar and workpiece is moved into engagement with the other, wherein the means for automatically positioning the bar surface with respect to the edge surface includes an element for positioning the workpiece so that its edge surface and the bar surface properly meet.

17. Apparatus according to claim 16, wherein the means for automaticall positioning the bar surface with respect to the edge surface includes an element for positioning the workpiece so that its edge surface and the bar surface properly meet.

18. Apparatus for veneering the edge of a workpiece, comprising a bar having a surface complementary to that of the edge, and means for automatically positioning the bar surface with respect to the edge surface as one of the bar and workpiece is moved into engagement with the other, wherein the bar is movably mounted on a frame, wherein the frame includes a horizontal component for supporting it, a vertical component for supporting the bar, and an upwardly inclined component extending in the direction of the oncoming workpiece for forcing the bar downwardly as it is moved by the workpiece engagement.

19. Apparatus according to claim 18, wherein the bar is supported on inclined rods.

20. Apparatus according to claim 16, wherein the frame has a horizontal component and the element rests on it.

* * * * *